United States Patent [19]

Rhum

[11] 4,296,225

[45] Oct. 20, 1981

[54] STABLE VINYL ACETATE AND AMINE MONOMER COPOLYMER EMULSIONS

[75] Inventor: David Rhum, Old Lyme, Conn.

[73] Assignee: Celanese Corporation, New York, N.Y.

[21] Appl. No.: 109,574

[22] Filed: Jan. 4, 1980

[51] Int. Cl.³ .......................... C08F 2/30; C08F 2/24; C08F 20/34
[52] U.S. Cl. .................. 526/260; 260/29.6 TA; 260/42.43; 526/263; 526/922; 526/312; 428/511
[58] Field of Search ................. 260/29.6 TA; 526/260

[56] References Cited

U.S. PATENT DOCUMENTS

| | | | |
|---|---|---|---|
| 3,040,012 | 6/1962 | Maeder | 526/81 X |
| 3,282,879 | 11/1966 | Werner, Jr. | 260/29.6 TA |
| 3,404,114 | 10/1968 | Snyder | 260/29.6 WB |
| 3,652,480 | 3/1972 | Coker | 260/29.6 WB |
| 3,925,442 | 12/1975 | Samour | 526/260 X |
| 4,042,553 | 8/1977 | Lindemann | 260/29.6 TA |
| 4,048,192 | 9/1977 | Stoll | 260/33.4 |

*Primary Examiner*—C. A. Henderson
*Attorney, Agent, or Firm*—Thomas J. Morgan

[57] ABSTRACT

This invention provides a process for preparing a stable aqueous emulsion composition which has excellent properties for application as a wet abrasion-resistant paper coating binder. The dispersed copolymer of the aqueous emulsion composition comprises a major proportion of vinyl acetate and a minor proportion of an amino-containing vinyl monomer. An important aspect of the emulsion preparation method is the addition of an aqueous solution of the amino-containing vinyl monomer as a separate feedstream, wherein the amine group in the said vinyl monomer is in the form of an amine-acid salt.

2 Claims, No Drawings

STABLE VINYL ACETATE AND AMINE MONOMER COPOLYMER EMULSIONS

BACKGROUND OF THE INVENTION

The present technology relates to a process for preparing stable high solids content aqueous emulsions.

Aqueous emulsions containing various homopolymers and copolymers, e.g., homopolymers and copolymers of vinyl esters, homopolymers and copolymers of lower alkyl acrylates and lower alkyl methacrylates, such as ethyl acrylate and methyl methacrylate, and the like, have been known for many years. The procedures used to prepare such polymer emulsions generally involve adding, with rapid stirring, one or more ethylenically unsaturated monomers to water which contains or to which is added, either simultaneously or subsequently, surfactants or emulsifying agents, a polymerization catalyst or initiator and, in many cases, a protective colloid-forming substance. This mixture is then heated to polymerization temperature with continued stirring, and held at that temperature until substantially complete polymerization of the monomer or monomers has occurred. The resulting polymer emulsion, upon cooling and filtering, can be used in many domestic and industrial applications, such as in paints or other coating compositions (e.g., paper coatings and textile-treating compositions), in adhesives or binders, in caulking compositions, and the like, depending on the particular polymers involved and the properties of the emulsions containing them.

The stability of an aqueous emulsion (i.e., an aqueous colloidal dispersion of a polymer) against coagulation or precipitation of its dispersed polymer component depends to some degree upon the kind and amount of surfactants, and protective colloids and the like which are contained in the aqueous emulsion medium. In many cases the aqueous emulsion is quite unstable, particularly when subjected to mechanical agitation, to heat or cold, or upon addition to the dispersion of polyvalent ions such as ionized calcium salts. In some instances, the stability of the latex can be improved by adding further amounts of surfactants or other stabilizers to the colloidal dispersion after completion of the polymerization step. However, latexes stabilized with external surfactants are stable only to a limited degree and are vulnerable to external destabilization.

Also, for many purposes water-soluble surfactants and stabilizers when added to increase emulsion stability are ultimately objectionable. Thus, in coatings derived from aqueous emulsions by evaporation of water from a deposite of such emulsions on a substrate, the non-volatile surface active agents tend to have a deleterious effect on the quality of the coatings.

Accordingly, it is an object of this invention to provide aqueous emulsion compositions which exhibit excellent stability against coagulation or precipitation of its dispersed polymer phase.

It is another object of this invention to provide a process for preparing stable high solids content aqueous emulsions which are adapted for application as paper coating binders.

It is a further object of this invention to provide latex coating compositions which exhibit improved wet abrasion resistance properties when coated on paper substrates.

Other objects and advantages of the present invention shall become apparent from the accompanying description and examples.

DESCRIPTION OF THE INVENTION

One or more objects of the present invention are accomplished by the provision of a process for preparing a stable aqueous emulsion composition adapted for application as a coating binder which comprises adding to an aqueous vinyl polymerization medium separate feedstreams of copolymerizable monomer components comprising (1) vinyl acetate; and (2) an aqueous solution of a vinyl monomer containing an amine-acid salt group.

In a preferred embodiment, this invention contemplates a process for preparing a stable aqueous emulsion composition adapted for application as a wet abrasion-resistant paper coating binder which comprises simultaneously adding to an aqueous medium containing a vinyl polymerization catalyst a combination of copolymerizable monomer components comprising (1) between about 70–95 weight percent of vinyl acetate; (2) an aqueous solution of between about 0.5–10 weight percent of vinyl monomer containing an aliphatic amine-acid salt group; and (3) 0.5–20 weight percent of at least one other vinyl monomer, all based on total monomer weight; wherein the aqueous solution of amino-containing vinyl monomer is added as a separate feedstream.

It is an important aspect of the herein described process that (1) the amino-containing vinyl monomer is in the form of an acid salt, and (2) the said amine-acid salt containing monomer is added to the polymerization medium as a separate feedstream.

In accordance with the present invention process, an emulsion is obtained which resists external destabilization effects such as freeze-thaw, mechanical agitation, and the like, and exhibits excellent shelf-life.

The stable aqueous emulsion produced by the invention process is characterized by a copolymer solids content of at least 40 weight percent, based on the total weight of the aqueous emulsion. Further, the formed copolymer has a relatively high molecular weight. For example, a typical copolymer will have an intrinsic viscosity of at least 1.0, when measured as a 2% solution in a solvent such as tetrahydrofuran. The term "intrinsic viscosity" is defined in Chapter 3 of the Textbook Of Polymer Science (Interscience Publishers, New York, 1962).

By the term "stable emulsion" is meant an aqueous emulsion which maintains its emulsion properties for a minimum of one day, and preferably for a minimum of 6 months and longer.

As noted hereinabove, the copolymer component of the invention aqueous emulsions contains as essential monomeric units a major proportion of vinyl acetate and a minor proportion of an amino-containing vinyl monomer.

The vinyl acetate proportion in the copolymer can vary in the range between about 70–95 weight percent, and preferably in the range between about 75–90 weight percent.

The amino-containing vinyl monomer proportion can vary in the range between 0.5–30 weight percent. It is preferred that the copolymer contains between about 0.5–10 weight percent of the amino-containing vinyl monomer, and additionally contains between 0.5–20 weight percent of at least one other vinyl monomer which is copolymerizable with the vinyl acetate and aminocontaining vinyl monomer under free-radical polymerization conditions.

The type of amino-containing vinyl monomers which may be employed include any vinyl polymerizable monomer which contains at least one primary, secondary or tertiary amine group. The said vinyl monomer is preferably one which contains an aliphatic amine group and which is soluble or at least partially soluble in an aqueous acid medium in the form of an amine-acid salt.

The term "aliphatic amine" includes alicyclic structures such as pyrrolidino, piperidino, piperazino and morpholino radicals.

Suitable amino-containing vinyl monomers include esters which are prepared by the reaction of an aminoalcohol with an $\alpha,\beta$-olefinically unsaturated carboxylic acid.

Illustrative of $\alpha,\beta$-olefinically unsaturated carboxylic acids are acrylic acid; methacrylic acid; $\alpha$-ethylacrylic acid; $\alpha$-chloroacrylic acid; crotonic acid; and the like.

Illustrative of aminoalcohols are 2-aminoethanol; 3-aminopropanol; 1-amino-2-propanol; 2-amino-2-methylpropanol; 2-aminobutanol; 3-aminobutanol; 3-amino-2-butanol; 2-methylaminoethanol; 2-dimethylaminoethanol; 2-ethylaminoethanol; 2-diethylaminoethanol; 3-methylaminopropanol; 3-dimethylaminopropanol; 3-ethylaminopropanol; 3-dimethylaminopropanol; 1-methylamino-2-propanol; 1-dimethylamino-2-propanol; 1-ethylamino-2-propanol; 1-diethylamino-2-propanol; 3-dimethylaminobutanol; 3-diethylaminobutanol; 3-dimethylamino-2-butanol; 3-ethylamino-2-butanol; 2-(2-aminoethylamino)ethanol; 2-aminocyclohexanol; 2-methylaminocyclohexanol; 2-dimethylaminocyclohexanol; N-(2-hydroxyethyl)pyrrole; N-(2-hydroxyethyl)piperidine; N-(2-hydroxyethyl)piperazine; N-(2-hydroxyethyl)morpholine; and the like.

Other suitable amino-containing vinyl monomers include vinyl dimethylaminoacetate; 1-vinyl-6-aminocyclohexane; dimethylaminoethyl vinyl ether; vinyl pyrrolidone; and the like.

The conversion of the amine group to an amine-acid salt group for purposes of the polymerization reaction is preferably accomplished with a mineral acid such as hydrochloric acid or sulfuric acid.

As indicated in the process definition hereinabove, the copolymer component of the aqueous emulsion composition can contain 0.5–20 weight percent of at least one additional vinyl monomer which is copolymerizable with the vinyl acetate and amino-containing vinyl monomer and which does not contain any interfering substituents.

Illustrative of suitable copolymerizable vinyl monomers are styrene; alkyl acrylates and methacrylates; acrylic acid and methacrylic acid; vinyl and vinylidene halides; allyl esters of saturated monocarboxylic acids; vinyl esters, excluding vinyl acetate; vinyl ethers; dialkyl esters of monoethylenically unsaturated dicarboxylic acids; ethylenically unsaturated monocarboxylic and polycarboxylic acids, and anhydrides, nitriles and amides of the said acids; and the like.

Other species of suitable monomers include ethyl acrylate, n-butyl methacrylate; 2-ethylhexyl acrylate; decyl acrylate; cyclohexyl crotonate; vinyl butyrate; allyl acetate; allyl lactate; methyl vinyl ether; isobutyl vinyl ether; methyl vinyl ketone; diethyl maleate; dipropyl fumarate; dioctyl itaconate; acrylonitrile; methacrylonitrile; acrylamide; N,N-dimethylacrylamide; N-methylolacrylamide; hydroxyalkyl acrylate; 1,3-butadiene, chloroprene, vinylnaphthalene; and the like.

With reference to other aspects of the polymerization reaction, the temperature of the aqueous medium during the course of the polymerization reaction is maintained in the range between about 20°–100° C., and on the average will be in the range between about 40°–90° C., depending on the reactivity of the monomers, the type and quantity of polymerization catalyst, the type and quantity of surfactants, and other such determining factors.

It is highly preferred to include in the polymerization medium between about 0.5–15 weight percent, based on the total monomer weight, of a surfactant (e.g., an anionic and/or nonionic emulsifying agent) which is conventionally employed in emulsion polymerization techniques. Usually the surfactant is introduced into the aqueous polymerization medium prior to the addition of the monomer feedstreams.

Illustrative of the different types of surfactants are the fatty acid soaps and especially water-soluble, long chain fatty acid soaps such as sodium or potassium laurate, myristate, palmitate, oleate, stearate, and the like. The water-soluble sodium or potassium soaps of tall oil and the rosin soaps, including disproportionated rosin soaps, also can be used. If desired, a secondary emulsifier can be present, which can be a conventional synthetic detergent. Examples of secondary emulsifiers include the alkali metal sulfonates derived from aryl sulfonic acids, e.g., sodium alkyl-naphthalene sulfonates.

Among the nonionic surfactants suitable for use in the present invention are polyethers, e.g., ethylene oxide and propylene oxide condensates in general, which include straight- and branched-chain alkyl and alkylaryl polyethylene glycol ethers and thioethers and polypropylene glycol ethers and thioethers, and more particularly substances such as the "Igepals," which is a trademark of GAF Corporation denoting members of a homologous series of alkylphenoxypoly(ethyleneoxy)ethanols, which series can be represented by the general formula

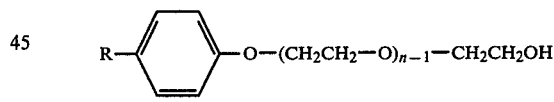

wherein R represents an alkyl substituent and n represents the number of moles of ethylene oxide employed. These nonionic surfactants include alkylphenoxypoly(ethyleneoxy)ethanols having alkyl groups containing between about 4 to about 240 ethyleneoxy units, such as the heptylphenoxypoly(ethyleneoxy)ethanols, nonylphenoxypoly(ethyleneoxy)ethanols and dodecylphenoxypoly(ethyleneoxy)ethanols. Other suitable nonionic surfactants are the "Tweens," which is a trademark of Atlas Powder Company denoting polyoxyalkylene derivatives of hexitol (including sorbitans, sorbides, mannitans and mannides) anhydride, partial long chain fatty acid esters, such as the polyoxyalkylene derivatives of sorbitan monolaurate, sorbitan monopalmitate, sorbitan monostearate, sorbitan tristearate, sorbitan monooleate and sorbitan trioleate; the "Pluronics," which is a trademark of Wyandotte Chemicals Corporation denoting condensates of ethylene oxide with a hydrophobic base, said base being formed by condensing propylene oxide with propylene glycol;

sulfur-containing condensates, e.g., those prepared by condensing ethylene oxide with higher alkyl mercaptans, such as nonyl, dodecyl, or tetradecyl mercaptan, or with alkylthiophenols wherein the alkyl substituent contains from 6 to 15 carbon atoms; ethylene oxide derivatives of long-chain carboxylic acids such as lauric, myristic, palmitic or oleic acid, or mixtures of acids, such as tall oil, and ethylene oxide derivatives of long-chain alcohols such as octyl, decyl, lauryl or cetyl alcohol.

Among the anionic surfactants suitable for use are the higher molecular weight sulfates and sulfonates, e.g., sodium and potassium alkyl sulfates, aryl sulfates, and alkylaryl sulfates and sulfonates, including sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene sulfonate and sodium xylene sulfonate; higher fatty alcohols, e.g., stearyl alcohol, lauryl alcohol, and the like, which have been ethoxylated and sulfonated; dialkyl esters of alkali metal sulfosuccinic acid salts, e.g., sodium diamyl sulfosuccinate, sodium dihexyl sulfosuccinate and sodium dioctyl sulfosuccinate; formaldehydenaphthalenesulfonic acid condensation products; and the like.

There can also be in included in the aqueous polymerization medium small amounts of one or more protective colloids. Included among such materials are ether linkage-containing protective colloids, such as hydroxymethyl cellulose, hydroxyethyl cellulose, ethylhydroxyethyl cellulose, carboxymethyl cellulose, ethoxylated starch derivatives, and the like. Other protective colloid-forming substances (i.e., those containing no ether linkages) can also be used either alone or together with the aforementioned ether linkage-containing materials, and included among these are partially and fully hydrolyzed polyvinyl alcohols, polyacrylic acid, sodium and other alkali metal polyacrylates, polyacrylamide, poly(methylvinyl ether/maleic anhydride), polyvinylpyrrolidone, water-soluble starch, glue, gelatin, water-soluble alginate such as sodium or potassium alginate, casein, agar, and natural and synthetic gums, such as gum arabic and gum tragacanth. All of these materials can be used in amounts conventionally used in emulsion polymerization procedures, i.e., in amounts usually ranging from about 0.1% to about 2% by weight of the polymer emulsion.

The polymerization reaction of the invention process is initiated and sustained by the presence of a catalytic quantity of a free radical polymerization catalyst or catalyst system. Suitable catalysts include inorganic peroxides such as hydrogen peroxide, alkali metal persulfates (e.g., sodium, potassium, and lithium persulfates) and ammonium persulfates, perphosphates and perborates; azonitriles, such as alpha, alpha-azo-bis-isobutyronitrile; and redox systems, including such combinations as mixtures of halogen peroxide, tert-butyl hydroperoxide, or the like, and any of an iron salt, a titanous salt, zinc formaldehyde sulfoxylate or sodium formaldehyde sulfoxylate; ammonium or alkali metal persulfates, borates or perchlorates together with an alkali metal bisulfite such as sodium metabisulfite; an alkali metal persulfate together with an arylphosphinic acid such as benzenephosphinic acid; and the like.

The amount of polymerization catalyst employed as generally no more than that required to obtain substantially complete monomer conversion. For example, from about 0.3% to about 0.5% by weight, of a perchlorate such as ammonium perchlorate together with an approximately equal amount of a bisulfite such as sodium metabisulfite, and preferably about 0.4% by weight of the perchlorate together with about 0.4% by weight of the bisulfite, each of these weight percentages being based on the total weight of the emulsion, can be employed.

If a redox system is selected, it is advantageous to dissolve the oxidant (e.g., ammonium persulfate) in the surfactant/water medium prior to the monomer addition, and then to add the reductant (e.g., a ferrous salt) as a feedstream during the course of the subsequent polymerization stage of the process.

The polymerization reaction is conducted by incrementally or continuously adding the separate feedstreams to the aqueous polymerization medium. Subatmospheric, atmospheric or superatmospheric pressures can be employed during all or any part of the polymerization stage of the process. If desired, the polymerization reaction can be conducted under an inert atmosphere, such as nitrogen, argon or carbon dioxide.

In general, the monomer feedstreams are added to the aqueous polymerization medium at a rate which does not cause buildup of unreacted monomers. The period of monomer addition usually will vary in the range between about 2-8 hours. In some cases, after the addition of the monomer feedstreams to the aqueous polymerization medium is completed, it is desirable to add an additional increment of polymerization catalyst to ensure substantially complete copolymerization of the monomers. This is advantageous when odorous monomers such as ethyl acrylate or butyl acrylate are involved.

When the polymerization stage of the process is completed, the resultant aqueous emulsion is treated with a basic reagent to neutralize any acidic material that is present, so as to yield an aqueous emulsion with optimal shelf stability. The basic reagent is added with stirring in a quantity sufficient to provide a final pH in the range between about 5-7. Preferred basic reagents include aqueous solutions of alkali metal and ammonium hydroxides.

A stable aqueous emulsion composition produced by the invention process is applicable as a film-forming component in products such as latex paint formulations, and the like. A stable high solids aqueous emulsion of the present invention has particular advantage for utility as a binder in a paper coating composition.

Thus, in a further embodiment the present invention provides a paper coating composition which comprises an aqueous dispersion of components comprising (1) a finely divided mineral filler; and (2) between about 5-50 weight percent, based on the weight of mineral filler, of a present invention aqueous emulsion as a binder component.

The filler employed in the paper coating composition can be any of the various known materials such as clay (e.g., bentonite, montmorillonite, kaolin, calcium carbonate, talc, titanium dioxide, colored lakes and toners, carbon black, graphite, aluminum powder or flakes, and the like. The term "mineral filler" is meant to include both inorganic materials and materials which are partially organic in composition.

The paper coating composition of the present invention additionally can contain other binder material such as starch, glue, gelatin, casein, urea-formaldehyde or melamine-formaldehyde aminoplasts, hydroxyethylcellulose, carboxymethylcellulose, and the like.

In the preparation of a paper coating composition, it is preferred to admix the mineral filler with water before it is blended with the aqueous emulsion binder medium. If the mineral filler is clay, then the pH of the clay slip is adjusted to about 8-10 to achieve optimum dispersion of the clay; also, the pH of the aqueous emulsion binder medium is adjusted to about 8-10 before it is blended with the clay slip, in order that the clay is maintained in a dispersed state after the blending procedure.

A paper coating composition is applied to a paper substrate by any convenient means such as with an immersion roll and doctor system, trailing blade, air knife, size press, gravure roller system, brush or spray coater, and the like.

After the coating operation, the coated paper is dried, and may then be calendered, and subsequently printed. Drying can be accomplished by directing hot air (110°-130° C.) against the coated paper surface for a period of about 30-45 seconds.

A coated paper product produced in accordance with the preferred practice of the present invention exhibits exceptional wet abrasion resistance, i.e., little or no coating failure as determined by a standardized test method. As described more fully hereinafter, wet abrasion resistance is tested by abrading a sample of coated paper under water, and then removing the sample and measuring the light transmission of the water with a spectrophotometer, which light transmission is affected by the relative turbidity of the water phase. Plain deionized water is considered 100% transmission, and a closed shutter is 0% transmission. A light transmission value above about 90% indicates no coating failure.

The following examples are further illustrative of the present invention. The components and other specific ingredients are presented as being typical, and various modifications can be derived in view of the foregoing disclosure within the scope of the invention.

EXAMPLE I

This example illustrates the preparation of a stable aqueous emulsion of a dispersed copolymer in which one of the monomers contains an amino-acid salt group.

(A)

| Components | Weight/grams |
|---|---|
| Distilled water | 400 |
| Nonionic emulsifier | |
| (Igepal CA-897, GAF) | 25.2 |
| Potassium persulfate | 2 |
| Sodium metabisulfite | 2.4 |
| Vinyl acetate | 336 |
| Ethyl acrylate | 40 |
| Acrylic acid | 2.5 |
| Dimethylaminoethyl methacrylate | 2.5 |

The distilled water, nonionic emulsifier and potassium persulfate are charged to a reactor. Nitrogen sparge is commenced, and it is continued during the course of the polymerization reaction.

The vinyl acetate, ethyl acrylate and acrylic acid are blended together as one feed. Another feed is prepared by dissolving the dimethylaminoethyl methacrylate in 150 grams of distilled water, and the pH is adjusted to a pH of about 5. A third feed is prepared by dissolving the sodium metabisulfite in 50 grams of distilled water.

The three feeds are added separately and simultaneously and gradually over a 3 hour period to the reactor contents. The reaction medium is maintained at a temperature of about 60° C. during the addition, and then for another one hour.

Tertiary-butylhydroperoxide (0.5 ml) and sodium metabisulfite (0.3 g) are added to the reaction medium, and the polymerization is continued for an additional hour at 60° C.

The resultant emulsion is adjusted to a pH of 5.5. The solids content is 40 weight percent, and the intrinsic viscosity (I.V.) of the copolymer is 1.16 (0.2% in THF).

(B)

In a similar manner, an emulsion containing a vinyl acetate (86%)/ethyl acrylate (10%)/dimethylaminoethyl acrylate (3%)/acrylic acid (1%) copolymer is prepared. The copolymer has an intrinsic viscosity of 1.61 (0.2% in THF). The solids content of the emulsion is about 40%.

The preparation procedure is repeated, except that the dimethylaminoethyl acrylate is not converted into a salt with hydrochloric acid, and the said monomer is not added as a separate feed.

The polymerization proceeds with difficulty because of foaming. The resultant emulsion is not uniform in color and appearance. The solids content of the emulsion is about 25.4%, and the emulsion is not sufficiently stable to employ as a binder in a paper coating composition.

EXAMPLE II

This example illustrates the superior wet abrasion resistance exhibited by a present invention aqueous emulsion paper coating composition.

The pH of a 286 gram quantity of a clay slip (200 grams of kaolin) is adjusted to about 9 with ammonium hydroxide. The pH of a 90 gram quantity of the aqueous emulsion of Example I(A) is also adjusted to about 9 with ammonium hydroxide.

The clay slip and the emulsion are admixed with 17 grams of water with stirring.

In the same manner, an aqueous emulsion coating composition is prepared employing 72 grams of a commercial emulsion system [vinyl acetate (89%)/ethyl acrylate (10%)/and maleic anhydride (1%); Polytex 6107, Celanese].

In each case the aqueous emulsion coating composition consists of 100 parts of kaolin and 18 parts of latex binder solids.

Each coating composition is drawn down on uncoated white cardboard, and the coated samples are dried and calendered, and then aged overnight at 50% relative humidity.

Discs are cut out of the samples and each disc is tested for wet abrasion resistance in a modified Taber Abraser. Each disc is submerged in 25 milliliters of distilled water. A counter-weighted brush is employed to abrade the submerged disc surface. The brush and disc are washed with 75 milliliters of water, and the resultant aqueous medium containing a suspension of abrasion solids is subjected to a light transmission test in a colorimeter (PC-600, Brinkmann).

A score of 100% light transmission indicates perfect resistance to abrasion by the tested disc sample of coated cardboard.

An average score of 80% (±2%) light transmission is exhibited by the cardboard coated with the present invention coating composition which contains a vinyl acetate (88.2%)/ethyl acrylate (10.5%)/dimethylaminoethyl methacrylate (0.65%)/acrylic acid (0.65%) copolymer binder.

An average score of 51% (±11%) light transmission is exhibited by the cardboard coated with the coating composition containing the Polytex 6107 commercial binder.

EXAMPLE III

This example illustrates the preparation of stable aqueous emulsions in accordance with the present invention, in which the dispersed copolymer contains varying proportions of different amine-acid salt containing vinyl monomers.

Each of the aqueous emulsions is prepared in accordance with the procedure of Example I(A). The copolymer that is formed has a composition corresponding to vinyl acetate (85–89%)/ethyl acrylate (10%)/amino-vinyl monomer (1–5%).

Each of the emulsions is employed as a binder component in a coating composition which is prepared in accordance with the procedure of Example II. All of the prepared coating compositions are wet abrasion in comparison with a coating composition containing a commercial emulsion binder.

The results of the comparative wet abrasion testing is indicated below in terms of a percent light transmission score as determined in a colorimeter. The invention coating compositions are identified in terms of type and quantity of amino-containing vinyl monomer contained in the binder copolymer.

| Comonomer | Weight Percent In Copolymer | % T |
|---|---|---|
| Dimethylaminoethyl methacrylate | 1 | 95 ± 1 |
| Dimethylaminoethyl methacrylate | 2 | 95 ± 1 |

-continued

| Comonomer | Weight Percent In Copolymer | % T |
|---|---|---|
| N-Hydroxyethyloxazolidine methacrylate | 1 | 95 ± 1 |
| N-Hydroxyethyloxazolidine methacrylate | 5 | 98 ± 1 |
| N-Hydroxyethylmorpholine acrylate | 3 | 94 ± 1 |
| N-Hydroxyethylmorpholine acrylate | 5 | 98 ± 1 |
| Polytex 6107 (Celanese) | — | 75 ± 10 |

The data indicate that the coating compositions within the scope of the present invention exhibit superior wet abrasion resistance as a paper coating in comparison with a paper coating composition containing a commercial type emulsion binder.

The superior properties of a present invention paper coating composition appear to be attributable to the presence of an aqueous emulsion binder which is a product of a specific method of preparation. It is essential that an amine-containing monomer is a contituent of the dispersed copolymer phase, and it is essential that the amino-containing monomer is added as a separate feedstream in the form of an amine-acid salt, during the emulsion polymerization stage of the preparation.

What is claimed is:

1. A process for preparing a stable aqueous emulsion composition adapted for application as a wet abrasion-resistant paper coating binder which comprises simultaneously adding to an aqueous medium containing a vinyl polymerization catalyst a combination of copolymerizable monomer components comprising (1) between about 70–95 weight percent of vinyl acetate; (2) an aqueous solution of between about 0.5–10 weight percent of vinyl monomer containing an aliphatic amine-acid salt group; and (3) 0.5–20 weight percent of at least one other vinyl monomer, all based on total monomer weight; wherein the aqueous solution of amino-containing vinyl monomer is added as a separate feedstream.

2. A process in accordance with the process of claim 1 wherein the intrinsic viscosity of the formed copolymer is at least 1.0.

* * * * *